(12) United States Patent
Litvin et al.

(10) Patent No.: US 6,721,814 B1
(45) Date of Patent: Apr. 13, 2004

(54) SYSTEM AND METHOD OF IMPROVING HOST PERFORMANCE CHARACTERISTICS BY INTELLIGENT SHIFT OF DATA CACHING FROM HOST TO CACHE-ENABLED MASS STORAGE SUBSYSTEM

(75) Inventors: Arkadi L. Litvin, Brookline, MA (US); Boris Zuckerman, Marblehead, MA (US)

(73) Assignee: EMC Corporation, Hopkinton, MA (US)

( * ) Notice: Subject to any disclaimer, the term of this patent is extended or adjusted under 35 U.S.C. 154(b) by 325 days.

(21) Appl. No.: 09/858,032

(22) Filed: May 15, 2001

(51) Int. Cl.[7] .................................................. G06F 3/00
(52) U.S. Cl. .......................................................... 710/6
(58) Field of Search ........................... 710/3–6, 11, 62; 711/3, 118

(56) References Cited

U.S. PATENT DOCUMENTS

| | | | |
|---|---|---|---|
| 6,324,621 B2 | * 11/2001 | Singh et al. | 710/68 |
| 6,574,667 B1 | * 6/2003 | Blumenau et al. | 709/229 |
| 2002/0078299 A1 | * 6/2002 | Chiou et al. | 711/119 |

* cited by examiner

Primary Examiner—Fritz Fleming
Assistant Examiner—Joshua D Schneider
(74) Attorney, Agent, or Firm—Robert Kevin Perkins; Leanne J. Fitzgerald; John M. Gunther

(57) ABSTRACT

An arrangement is disclosed for use in connection with a host computer connected to a mass storage subsystem, the mass storage subsystem storing information for use in connection with processing of at least one program by the host computer. The arrangement comprises a program input/output interface, a mass storage subsystem interface and a file system control. The program input/output interface is configured to receive program input/output read and write requests from a program, each program input/output read and write request initiating an input/output operation in connection with information stored on a mass storage subsystem. The mass storage subsystem interface is configured to facilitate communications with the mass storage subsystem, including transferring a storage subsystem input/output read and write request thereto and receiving information therefrom. The file system control is configured to, in response to a program input/output read or write request received by the program input/output interface, generate a storage subsystem input/output read or write request for transmission by the mass storage subsystem interface to the mass storage subsystem and to transfer information to be transferred during the input/output operation between the program input/output interface and the mass storage subsystem interface, and to selectively cache the information in a file system cache maintained by the host computer.

6 Claims, 6 Drawing Sheets

FIG. 3A

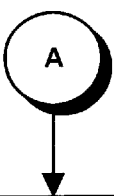

106. CHANNEL DIRECTOR 30 CACHES THE INFORMATION TO BE STORED IN THE CACHE 31

107. CHANNEL DIRECTOR 30 PROVIDES A NOTIFICATION OF THE STORAGE REQUEST TO THE DISK DIRECTOR 32

108. DISK DIRECTOR 32 ENABLES THE INFORMATION TO BE RETRIEVED FROM THE CACHE 31 AND STORED ON THE DISK STORAGE DEVICE(S) 33

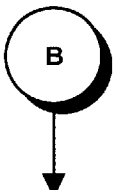

110. FILE SYSTEM 22 DETERMINES WHETHER THE INFORMATION TO BE RETRIEVED IS IN ITS FILE SYSTEM CACHE 23

YES

111. FILE SYSTEM 22 RETRIEVES THE INFORMATION FROM THE FILE SYSTEM CACHE 23 AND PROVIDES IT TO THE APPLICATION PROGRAM 20 THAT GENERATED THE INPUT/OUTPUT REQUEST

NO

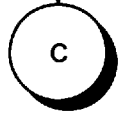

SYSTEM AND METHOD OF IMPROVING HOST PERFORMANCE CHARACTERISTICS BY INTELLIGENT SHIFT OF DATA CACHING FROM HOST TO CACHE-ENABLED MASS STORAGE SUBSYSTEM

FIELD OF THE INVENTION

This invention relates generally to the field of digital computer systems, and more specifically to file systems for use in such digital computer systems. The invention specifically provides an arrangement that intelligently uses a host cache in a host computer, that is, switching caching by a host computer's file system on or off based on static application profiles and dynamic input/output patterns, and utilizing the caching by a mass storage subsystem connected to the host computer. Disabling file system caching in a host computer can enhance input/output throughput and other host performance characteristics since that can eliminate extra processes and expenses that are associated with generating and storing additional copies of data that may occur if caching is performed both by the mass storage subsystem and the host computer's file system.

BACKGROUND OF THE INVENTION

Digital computers store information, including data and programs for processing the data, in the form of files. Typically the files are stored in a mass storage subsystem, in which the information is stored in, for example one or more disk storage devices or other device(s) in which information can be stored in a long-term basis. When a computer is to execute a program, which may be either an application program or a program that forms part of the operating system, at least some portion of the file or files that contain the program are read from the mass storage subsystem in which they are stored, and provided to the computer for execution. Similarly, when a program needs data for processing, at least some portion of the file or files containing the data are read from the mass storage subsystem in which they are stored and provided to the computer for processing by the program. While the program is processing the data, it may generate processed data that can be transferred by the computer to the mass storage subsystem for storage. The processed data may be stored in a pre-existing file, or a new file may be created to store the data. Similarly, while a program is being executed, it may generate status or other information that may be transferred by the computer to the mass storage subsystems for storage in either a pre-existing file or a new file.

Disk storage devices store information in storage locations, with each storage location being capable of storing a selected amount of information. Typically, a computer provides a file system, which comprises a portion of its operating system, that actually identifies the storage locations in the disk storage units in which the files are actually stored, which relieves programs of the necessity of knowing the particular storage locations on the disk storage devices in which their files are stored. When information is to be read for a program, an input/output read request is issued to the file system identifying the file and the portion of the file whose data is to be read. In addition, the input/output read request can provide a pointer to a buffer, which may be a temporary buffer, in which the data is to be stored by the file system for use by the program. In response to the input/output read request, the file system will initially determine whether the requested data is in a cache that it maintains. If the requested data is in the file system's cache, the file system will copy the data from the file system cache to the buffer, thereby to provide it to the requesting program.

On the other hand, if the file system determines that the requested data is not in the file system cache, it will identify the disk storage device(s) and storage locations thereof on which the requested data is stored, and issue a read request to the disk storage devices, which identifies the storage locations from which information is to be read. The information to be read will generally include the information requested by the program and, in a "read ahead" technique, may also include other information that was not requested by the program, but which is proximate the requested information in the file. The read request provided by the file system to the disk storage devices will identify the storage locations on the disk storage devices from which the information is to be retrieved. Typically, during a read operation, the contents of entire storage location(s) will be read, even if the information that is to be provided in response to the input/output read request is a subset of the information that is stored in the storage location(s). After the disk storage devices have provided the information requested by the file system to the file system, the file system will cache the information in its file system cache. In addition, the file system will copy the information that was requested in the original input/output read request to the buffer pointed to by the input/output read request. The file system can thereafter notify the program that the input/output retrieval operation has been completed, after which the program can make use of the retrieved information. It will be appreciated that, if more information was read than had been requested by the program and stored in the cache, if the program later issues an input/output read request for the additional information, the additional information may be in the file system cache, in which case the file system will be able to satisfy the input/output read request from the file system cache.

Similarly, when data from a program is to be written, the program issues an input/output write request to the file system, the write request identifying the file, the portion of the file in which the data is to be written, and the data that is to be written in the identified portion. The data that is to be stored may be stored in a buffer, and the program can identify the data to be stored by providing a pointer to the buffer containing the data. In response to the input/output write request, the file system identifies the disk storage devices and storage locations thereon on which the data is to be stored. Essentially, the file system will perform a storage operation in three phases. In the first phase, if the contents of the storage location(s) in which the data to be stored are not already in the file system cache, the file system will enable them to be retrieved and stored in the file system cache in the same manner as during a read operation described above. After the contents of the storage location(s) have been stored in the file system cache, the file system will update the contents as stored in the file system cache with the data to be stored. At some point later, the file system can enable the updated cached contents to be copied to the disk storage devices for storage. While the updated cached contents are in the file system cache, the file system can satisfy input/output read requests issued by programs for the data from the file system cache.

The use of file system caching can be advantageous particularly in connection with programs whose input/output profiles are such that data to be read is likely to be stored the file system cache. While some programs have such input/output profiles and may benefit from caching of data read from disk storage devices, other programs do not, and caching by the file system for such programs may be a waste of the host computer's memory that is provided for such caching, as well as processor capacity that may be consumed to perform the caching. In addition, a number of modern mass storage subsystems include large caches in which information is stored during both read and write operations. This, combined with the fact, in modern information transfer systems, such as FibreChannel, InfiniBand, and the like, that can be used to connect host computers to mass storage subsystems, information can be transferred very rapidly, means that information can be quickly transferred from the mass storage subsystem's cache to the host computer.

SUMMARY OF THE INVENTION

The invention provides a new and improved system and method that intelligently uses a host file system cache in a host computer, that is, switching caching by a host computer's file system on or off based on static application input/output profiles and dynamic input/output patterns, and utilizing caching provided by a mass storage subsystem that is connected to the host computer.

In brief summary, the invention provides an arrangement for use in connection with a host computer connected to a mass storage subsystem, the mass storage subsystem storing information for use in connection with processing of at least one program by the host computer. The arrangement comprises a program input/output interface, a mass storage subsystem interface and a file system control. The program input/output interface is configured to receive program input/output read and write requests from a program, each program input/output read and write request initiating an input/output operation in connection with information stored on a mass storage subsystem. The mass storage subsystem interface is configured to facilitate communications with the mass storage subsystem, including transferring a storage subsystem input/output read and write request thereto and receiving information therefrom. The file system control is configured to, in response to a program input/output read or write request received by the program input/output interface, generate a storage subsystem input/output read or write request for transmission by the mass storage subsystem interface to the mass storage subsystem and to transfer information to be transferred during the input/output operation between the program input/output interface and the mass storage subsystem interface, and to selectively cache the information in a file system cache maintained by the host computer.

The file system control can be configured to control caching of the information in the file system cache based on any of a number of criteria, including, for example, static application profiles and dynamic input/output patterns, such as the amount of information to be transferred between the program and the mass storage subsystem during the input/output operation, the type of program that provided the program input/output request, and any of a number of other criteria.

Disabling file system caching in a host computer can enhance input/output throughput and other host performance characteristics since that can eliminate extra processes and expenses that are associated with additional copies of data that may occur if caching is performed both by the mass storage subsystem and the host computer's file system.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
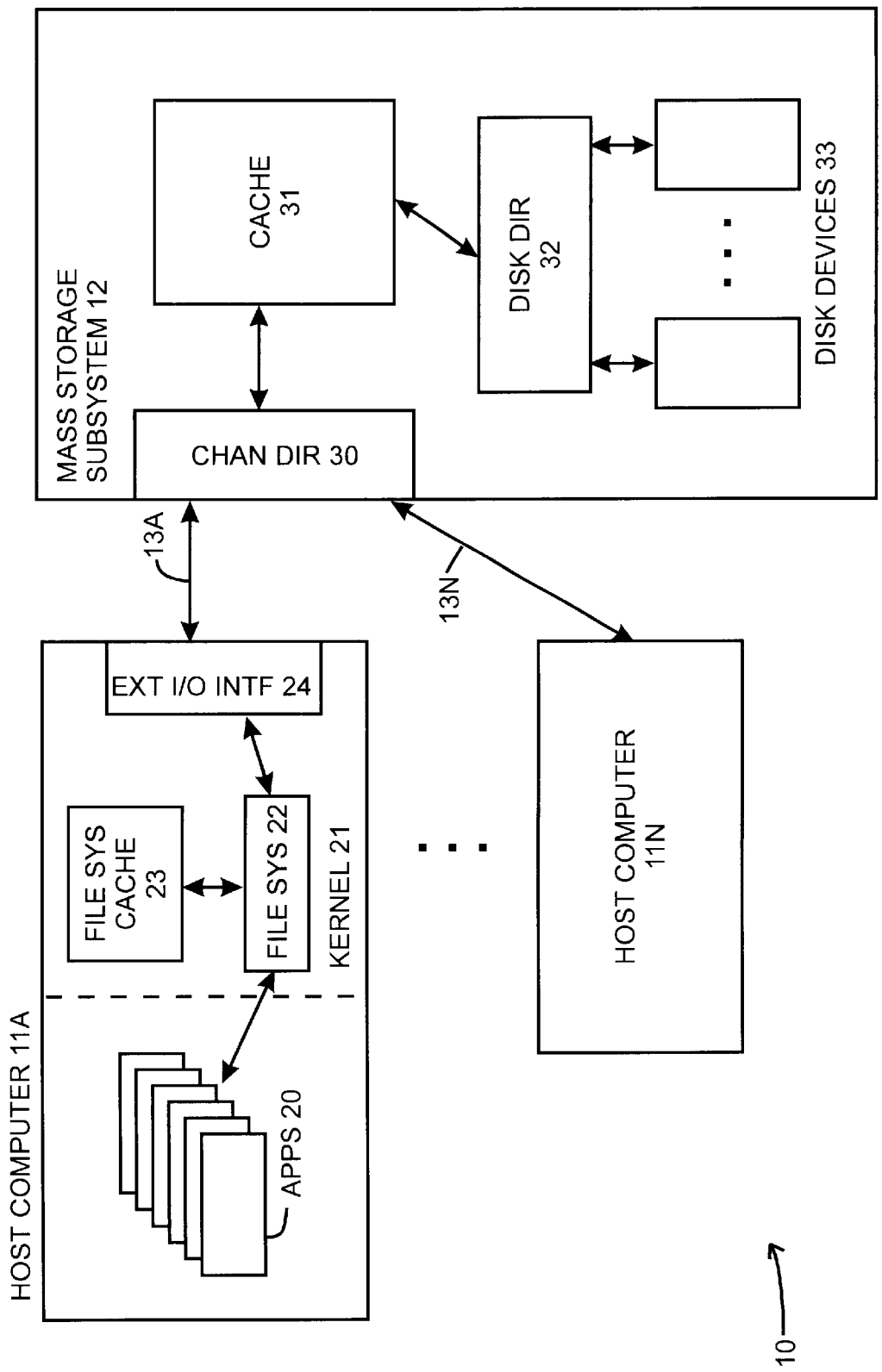
FIG. 1 is a functional block diagram of a host computer system including an arrangement for selectively disabling caching by the host computer's file system, constructed in accordance with the invention.

FIG. 1 is a functional block diagram of a system 10 including one or more computers, identified as host computers 11A through 11N (generally identified by reference numeral 11$n$), connected to a mass storage subsystem 12 over respective communication links 13$n$. One or more of the host computers 11$n$ may comprise any kind of computing device, including personal computers, workstations, minicomputers, mainframe computers, and personal digital assistants (PDA's). In addition, a host computer 11$n$ may comprise any type of device that can utilize, process and/or display information in digital form. Generally, the mass storage subsystem 12 stores information that can be read by the host computers 11$n$ for processing, display or other use. The host computers 11$n$, to read information for processing, display or other utilization, can generate read requests for transmission to the server over the respective communication link 13$n$. In response to the read requests, the mass storage subsystem 12 normally will provide information to the host computers 11$n$ for utilization thereby. On the other hand, the host computers 11$n$, as well as a number of other types of devices such as data acquisition devices, can also generate information for storage by the mass storage subsystem 12. To enable information to be stored by the mass storage subsystem 12, the computers 11$n$ can generate write requests, also for transfer to the mass storage subsystem 12 over the respective communication link 13$n$. The write requests are typically accompanied by the information to be stored by the mass storage subsystem 12, and, following receipt of the write requests, the mass storage subsystem 12 can store the information. The stored information may later be read from the mass storage subsystem 12 for processing or other use.

The host computers 11$n$ are generally similar and host computer 11A will be functionally described in detail. With reference to FIG. 1, host computer 11A includes one or more application programs generally identified by reference numeral 20, which are generally processed in what will be referred to herein as "user space." In addition, the host computer 11A provides an operating system kernel 21 that are generally processed in what will be referred to herein as "kernel space." The operating system kernel 21 provides a number of services to the application programs 20, as will be appreciated by those skilled in the art. For example, the kernel 21 facilitates processing of a plurality of application programs 20 by the host computer 11A contemporaneously, in a manner so that the application programs will not interfere with each other. The kernel 21 may also provide an arrangement by which the application programs 20 can communicate with each other. In addition, the kernel 21 provides an arrangement, which will be referred to as file system 22, by which the application programs 20 can enable information to be read from the mass storage subsystem 12 for, for example processing, display or other operation as will be appreciated by those skilled in the art. In addition, the file system 22 facilitates storage by the application programs 20 of processed information on the mass storage subsystem 12. The file system 22 provides the information storage services so as to ensure that the various items of information associated with the various application programs 20 do not interfere with each other, that is, that, when an item of information associated with one application program 20 is stored on the mass storage subsystem 12, it does not over-write an item of information that is associated with another application program 20. In addition, the file system 22 provides the information writing and reading services so as to isolate the application programs 20 from needing to know the organization of the information on the mass storage subsystem 12.

In addition to the file system 22, the kernel 21 is also provided with a file system cache 23, and an external input/output interface 24. The file system cache 23 is generally used by the file system 22 to cache information during both read and write operations, as will be described in more detail below. The external input/output interface 24 is connected to the communication link 13A and facilitates communication between the host computer 11A and the mass storage subsystem 12. Communications between the external input/output interface 24 and the mass storage subsystem 12 over the communication link 13A may be by way of any of a number of popular communication protocols, including Ethernet, small computer system interface (SCSI), FibreChannel, InfiniBand, or other protocols as will be apparent to those skilled in the art.

The host computer 11A may be implemented in a number of forms, as will be apparent to those skilled in the art. Generally, the host computer 11A will be provided with one or more processors and memory, and may also be provided with one or more disk storage devices to provide local long-term storage. The host computer 11A may also include a user interface that can include a video display for displaying information to an operator, operator input devices such as a keyboard for entering information in text form and a mouse or other pointing device. The host computer 11A can also include other facilities, such as a printer for generating hardcopy output, a data acquisition device, and/or other devices as will be apparent to those skilled in the art.

Generally, the file system 22 initiates an input/output operation, which may be either a read operation, in which information is read from the mass storage subsystem 12, or a write operation, in which information is written on the mass storage subsystem 12, in response to an input/output request from an application program 20. In response to an input/output read request, the file system 22 generates one or more read requests, which are transferred through the external input/output interface 24 and over the communication link 13A to the mass storage subsystem 12, as will be described in more detail below. In response to a read request from the file system 22, the mass storage subsystem 12 will obtain the requested information and transfer it over the communication link 13A to the host computer 11A. The external input/output interface 24 will receive the information from the communication link 13A and provide it to the file system 22. The file system 22 will initially cache the information received from the external input/output interface 24 in its file system cache 23, and thereafter provide the information to the application program 20 that issued the input/output read request.

Similarly, in response to an input/output write request, generally the file system 22 will cache the information in its file system cache 23. In addition, the file system 22 will generate one or more write requests, which include information to be stored, and which are transferred through the external input/output interface 24 and over the communication link 13A to the mass storage subsystem 12. In response to a write request from the file system 22, the mass storage subsystem 12 will store the information.

In response to an input/output read request from an application program 20, the file system 22, can, instead of initially generating read requests for transfer to the mass storage subsystem, initially determine if some or all of the information to be read is in its file system cache 23. If some or all of the information to be read is in the file system cache 23, the file system 22 can use the information in the file system cache 23 to satisfy at least a portion of the input/output read request, and issue read request(s) to the mass storage subsystem 12 only for the portion that is not stored in the file system cache 23. This may reduce the time required to complete the input/output read request.

In one embodiment, the mass storage subsystem 12 includes a number of components including one or more channel directors 30, a cache 31, one or more disk directors 32 and one or more disk storage devices generally identified by reference numeral 33. If the mass storage subsystem 12 is provided with multiple disk directors 32, each disk director may be connected to a subset of the disk storage devices 33. In addition, if the mass storage subsystem 12 is provided with multiple disk directors 32, at least some of the disk storage devices 33 may be connected to multiple disk directors 32 so that, if one disk director 32 fails, another disk director may be provided to connect to the disk storage devices 33 that are connected thereto. The channel director 30 is connected to one or more host computers 11n over respective communication links 13n and receives storage and read requests from the host computers 11n thereover. In addition, the channel director 30 will transmit the read information to the host computers 1 in over the respective communication links 13n. After the channel director 11n receives a write request, it will cache the information that is to be stored in the mass storage subsystem 12 in the cache 31, and provide a notification of the write request to the disk director 32. Some point in time later, the disk director 32 can read the information from the cache 31 and transfer it to the appropriate disk storage device(s) for storage.

Similarly, when the channel director 30 receives a read request from a host computer 11n over the respective communication link 13n, it will initially determine whether the information to be read is in the cache 31. If all of the information to be read is not in the cache 31, the channel director 30 will provide a notification to the disk director 32 requesting the disk director 32 to read the information from the disk storage device(s) 33 on which the information is stored. When the disk storage device(s) 33 on which the information to be read is stored provide the information to the disk director 32, the disk director 32 will cache the information in the cache 31 and notify the channel director 30. Thereafter, the channel director 30 can read the information from the cache 31 and transfer the information to the host computer 11n that issued the read request over the respective communication link 13n. The disk director 32, in addition to reading the specific data that was requested in the read request, may also "prefetch" additional data for storage in the cache 31.

The mass storage subsystem 12 may be provided with several working queues or other arrangements (not separately shown) that are used by the channel director 30 and disk director 32 to transfer the above-described notifications therebetween.

As will be apparent from the above description, as between application programs 20 on one host computer 11n that issue respective input/output storage and read requests, and the disk storage devices 33 on which the information is stored. As noted above, if the file system 22 determines that information requested in an input/output read request from an application program 20 is cached in the file system cache 23, it can read the information from the file system cache 23 and provide it to the application program 20 without having to issue a read request to the mass storage subsystem 12 for that information. Similarly, if the channel director 30 determines that information requested in a read request from a host computer 11n is in the mass storage subsystem's cache 31, it can retrieve the information from the cache 31 and provide it to the host computer 11n without having to issue a read notification to the disk director 32 for that information. Generally, if the mass storage subsystem's cache 31 is relatively large (in which case most if not all of the information cached in the file system cache 23 is also likely to be cached in the mass storage subsystem's cache 31), the channel director 30 is capable of providing relatively quick responses in connection with read requests in which information is already in the mass storage subsystem's cache 31, and the communication link 13n transfers information relatively quickly, all of which can be the case, the caching of the information by the file system 22 is somewhat redundant as far as caching is concerned, since information could be obtained from either cache 23 or 31 with approximately response time. On the other hand, the time required for the file system 22 to cache the information during both read and write operations may affect the response time for completing those operations. In addition, it will be appreciated that the caching by the file system 22 requires processing by the host computer's processor that might be used for other purposes in the absence of caching by the file system 22.

Figure 2A:
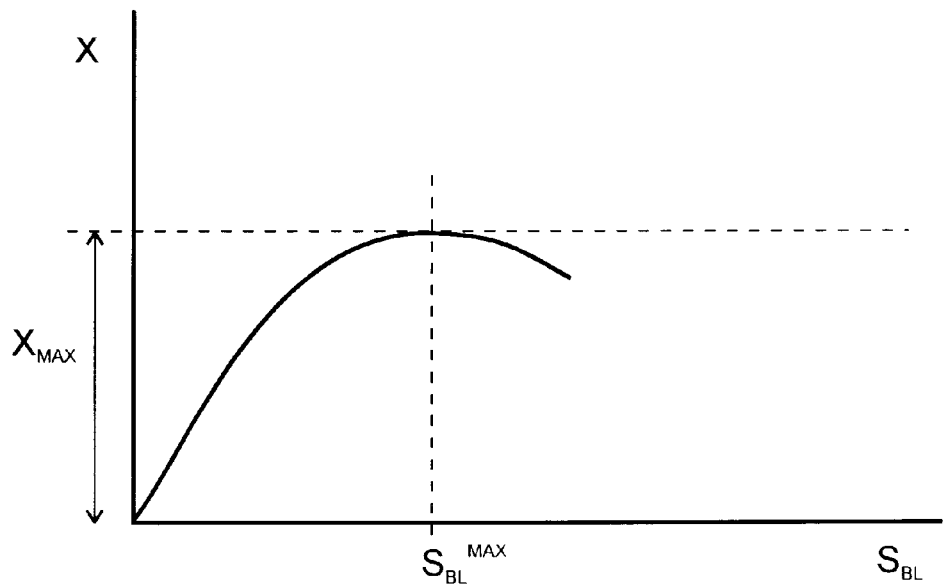
FIGS. 2A and 2B are graphs that are useful in understanding the operation of the selective file system cache disabling arrangement used in the digital computer system depicted in FIG. 1.

The invention provides an arrangement for selectively disabling caching by the file system 22 in its file system cache 23. This will be described in connection with the graphs depicted in FIGS. 2A and 2B. FIG. 2A depicts a graph of write or read throughput "X" as a function of input/output block size $S_{BL}$. Generally, the total input/output response time $R_r$ required for a request "r" is the sum of two components, including a portion $R_{BS}$ that is a function of the size of the input/output block $S_{BL}$ that is to be read or written during the input/output operation, and a supplemental portion $R'_{SUP}$ time that does not depend on the size of the block that is to be read or written during the input/output operation, or $$R_r = R_{BS} + R'_{SUP} \quad (1).$$

The input/output block size response time $R_{BS}$, in turn, is the sum of the normalized block size response time $\alpha R'_{BS}$, where "$R'_{BS}$" is the normalized input/output block size response time and "$\alpha$" is the time required to write one byte of information on, or read one byte of information from, a disk storage device 33, and $R_{FSC}$, the contribution of the time required to store information in the file system cache 23 during a storage operation, or $$R_{BS} = \alpha R'_{BS} + R_{FSC} \quad (2).$$

Generally, the contribution of the time required to store information in the file system cache 23 during a storage operation is non-linear in relation to the input/output block size, illustratively $$R_{FSC} = R_{FSC_0} + \alpha' S_{BL} + \beta S_{BL} \quad (3),$$

where "$R_{FSC_0}$," "$\alpha$" and "$\beta$" are constants, so that $$R_{BS} = R_{FSC_0} + (\alpha + \alpha') S_{BL} + \beta S_{BL}^2 \quad (4).$$

Inserting equation (4) into equation (1), the total response time $R_r$ for a request "r" is given by $$R_r = R'_{SUP} + R_{FSC_0} + (\alpha + \alpha') S_{BL} + \beta S_{BL}^2 \quad (5).$$

The throughput "X" is a measure of the ratio of the block size $S_{BL}$ to the total response time $R_r$, or $$X = \frac{S_{BL}}{R'_{sup} + R_{FSC_0} + (\alpha + \alpha') S_{BL} + \beta S_{BL}^2}. \quad (6)$$

Generally, $R'_{SUP}$ and $R_{FSC_0}$ will be constants for a particular system 10. FIG. 2A depicts a graph of the curve of throughput X as a function of the input/output block size $S_{BL}$ as specified by equation (6) (that is, in the presence of caching by the file system 22). The slope of the curve depicted in FIG. 2A for any value of input/output block size $S_{BL}$ can be determined by differentiating equation (6) with respect to $S_{BL}$.

$$\frac{dX}{dS_{BL}} = \frac{1}{(R'_{sup} + R_{FSC_0} + (\alpha + \alpha') S_{BL} + \beta S_{BL}^2)} - \frac{(\alpha + \alpha') S_{BL} + 2\beta S_{BL}^2}{(R'_{sup} + R_{FSC_0} + (\alpha + \alpha') S_{BL} + \beta S_{BL}^2)^2}. \quad (7)$$

Rearranging terms in equation (7), $$\frac{dX}{dS_{BL}} = \frac{R'_{sup} + R_{FSC_0} - \beta S_{BL}^2}{(R'_{sup} + R_{FSC_0} + (\alpha + \alpha') S_{BL} + \beta S_{BL}^2)^2}. \quad (8)$$

As shown in FIG. 2A, the throughput "X" (equation (6)) increases from $S_{BL}=0$ until it reaches a maximum, after which it again decreases. The value of the block size $S_{BL}$ for which the throughput X is a maximum can be determined by setting the derivative (equation (8)) to zero and solving for $S_{BL}$. It is apparent from equation (8) that the block size for which the derivative (equation (8)) is zero is $$S_{BL}^{\max} = \sqrt{\frac{R'_{sup} + R_{FSC_0}}{\beta}},$$

at which point the throughput is $$X_{\mathrm{MAX}} = \frac{1}{2\sqrt{\beta} \sqrt{R'_{sup} + R_{FSC_0}} + (\alpha + \alpha')}. \quad (9)$$

In the absence of caching by the file system 22, the terms $R_{FSC_0}$, $\alpha'S_{BL}$ and $\beta S_{BL}^2$ in equations (3) through (8) vanish, in which case the throughput "X" is given by $$X = \frac{S_{BL}}{\alpha S_{BL} + R'_{SUP}}. \tag{10}$$

Figure 2B:
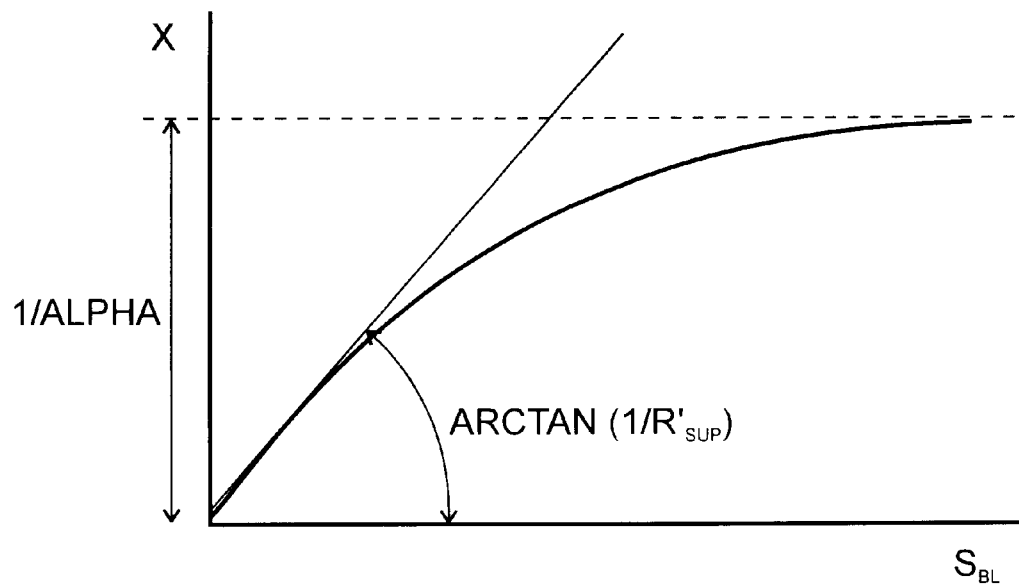

FIG. 2B depicts a graph of the curve of the throughput "X" as a function of $S_{BL}$ as specified in equation (10) (that is, in the absence of caching by the file system 22), and shows that the throughput "X" increases from $S_{BL}=0$ and approaches $X=1/\alpha$ asymptotically, as would be expected from equation (10) with $\alpha S_{BL} >> R'_{SUP}$. In addition, FIG. 2B indicates that, unlike the situation depicted in FIG. 2A (with caching by the file system 22), the throughput "X" will not decrease, but generally continues increasing with increasing block size.

From the above, it will be apparent that disabling caching by the file system 22, particularly for block sizes for which $S_{BL}$ is equal to or greater than $S_{BL}^{max}$ (reference FIG. 2A), that is, equal to or greater than $$S_{BL}^{max} = \sqrt{\frac{R'_{sup} + R_{FSC_0}}{\beta}},$$

can increase throughput. With this background, the invention provides an arrangement for selectively disabling caching by the file system 22 at least for input/output block sizes for which $S_{BL}$ is greater than or equal to $S_{BL}^{max}$. This can be accomplished in a number of ways. For example, the file system 22 can determine for itself whether the information to be written or read is to be cached in the file system cache 23. In that case, the file system 22 itself can be provided with a value that identifies the input/output block size for which $S_{BL}$ is greater than or equal to $S_{BL}^{max}$ and the file system 22 itself can, for each write or read request, determine whether to cache the information to be written or read in its file system cache 23 based on the amount of information to be read. The file system 22, or another component (not shown), can collect statistics while the host computer 11A processes programs, from which $S_{BL}^{max}$ can be determined.

Alternatively or in addition, the file system 22, or another component (also not shown) can collect statistics while the host computer 11A processes programs with file system caching enabled, from which a curve of throughput "X" as a function of block size $S_{BL}$ can be developed. If, as is the case in connection with the curve depicted in FIG. 2A, there is a block size at which throughput "X," after increasing, begins to decrease, a value for $S_{BL}^{max}$ can be read directly from the curve, which can be used in connection with determinations as to whether to cache information to be read or written during an input/output operation. Depending on the input/output pattern for the programs processed by the host computer 11A, the curve of throughput as a function of block size may or may not have a block size at which throughput "X," after increasing, begins to decrease. If there is no block size for which the throughput "X," after increasing, begins to decrease, all information to be read or written can be cached in the file system cache during an input/output operation.

As yet a further alternative, the file system 22 or another component can collect statistics for a host computer 11A as described above and develop curves at different times of day and/or different days of the week. This may be useful if, for example the host computer is processing different programs or sets of progams at different times of day and/or on different days of the week, but generally the same program or set of programs at respective times of day or days of the week. In that case, for different times of day or days of the week, there may be different values of block size, if any, which can be used in connection with determinations as to whether to cache information to be read or written during an input/output operation.

Alternatively, if there is a block size above which information to be written or read is not to be cached in the file system cache 23, instead of having the file system 22 make a determination as to whether, for an input/output read or write operation, the information to be read or written is to be cached in the file system cache 23, the application programs 20 themselves make such a determination. In that case, the application programs 20 themselves can be provided with the block size, and they can, in the input/output write and read requests that they issue to the file system 22, provide an indication to the file system 22 that the information to be written or read is or is not to be cached in the file system cache 23.

As a further alternative, the file system 22 or each application program 22 can determine whether information to be written or read is not to be cached in the file system cache 23 based on the type of application program 20 and its expected input/output pattern. For example, application programs of the video client type often have input/output patterns such that transfers are typically of the read type, have input/output block sizes on the order of 64 KB (that is, kilobytes), and typically information is retrieved sequentially from a file. On the other hand, application programs of the write streaming type have input/output patterns such that transfers are typically of the storage type, have input/output block sizes on the order of 64 KB, and information is stored sequentially in a file. Other types of application programs have other typical input/output block sizes and reading and writing patterns. For example, application programs of the data warehousing type typically have input/output patterns that include both write and read operations with input/output block sizes on the order of 64 to 256 KB. Application programs of the computer-assisted design type typically have input/output patterns that include both write and read operations with input/output block sizes on the order of 64 to 128 KB. Application programs of the video and graphics editing and multi-media type typically have input/output patterns that include both write and read operations with input/output block sizes on the order of 512 KB to 256 MB (that is, megabytes). In these cases, since these types of application programs typically have input/output patterns of known sizes, if the file system 22 is provided with information as to an application program's type, it can determine whether to cache, in its file system cache 23, information that is to be stored or retrieved during an input/output operation based on the type of the respective application program that issued the respective write or read request.

Other methodologies for controlling caching by the file system 22 in its file system cache 23 based on input/output block size $S_{BL}$ will be apparent to those skilled in the art. In addition, it will be apparent that a system 10 may make use of multiple methodologies concurrently.

Figure 3:
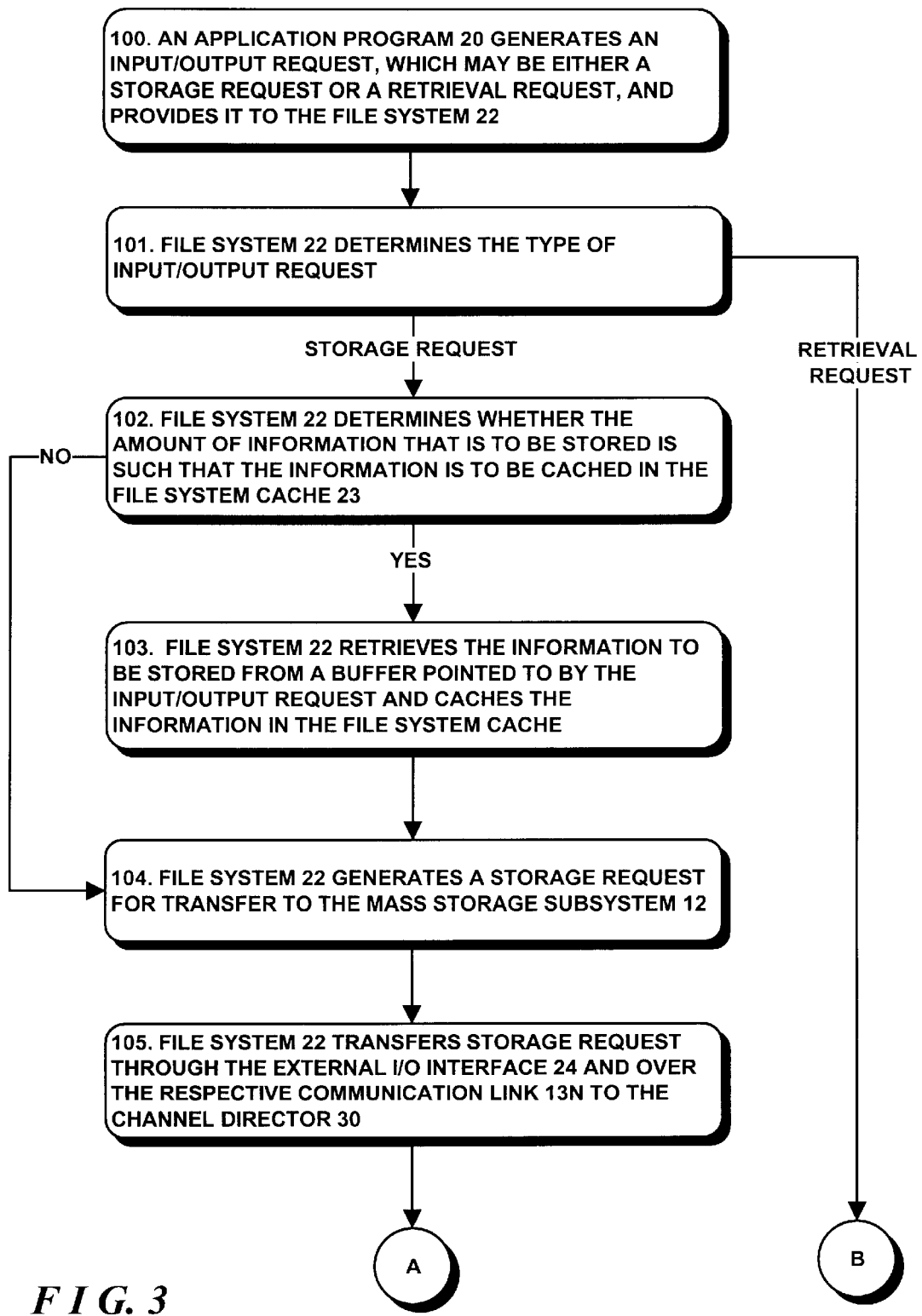
FIG. 3 is a flow chart depicting operations performed by the selective file system cache disabling arrangement in connection with selectively disabling caching by the file system.
Figure 3B:
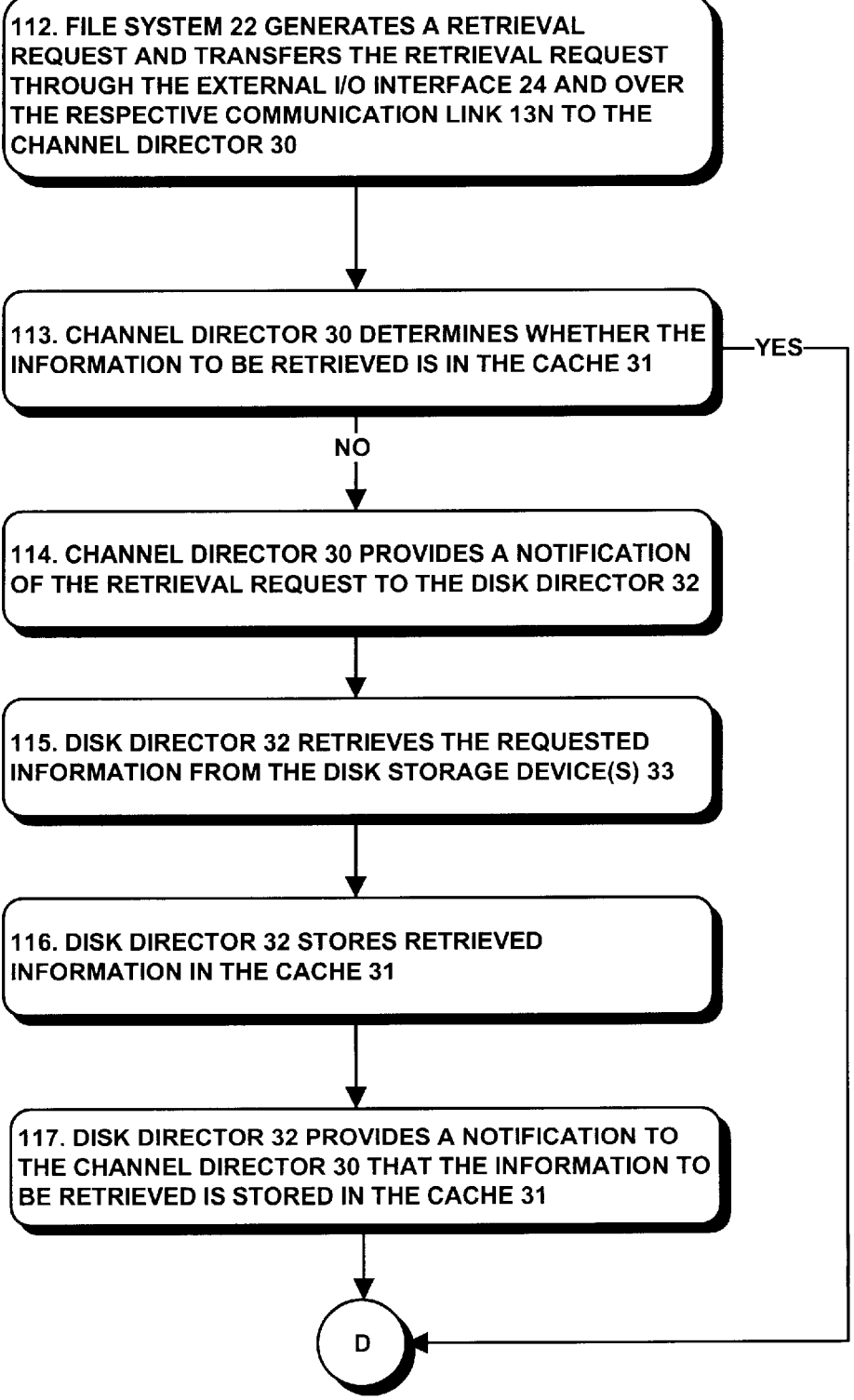
Figure 3C:
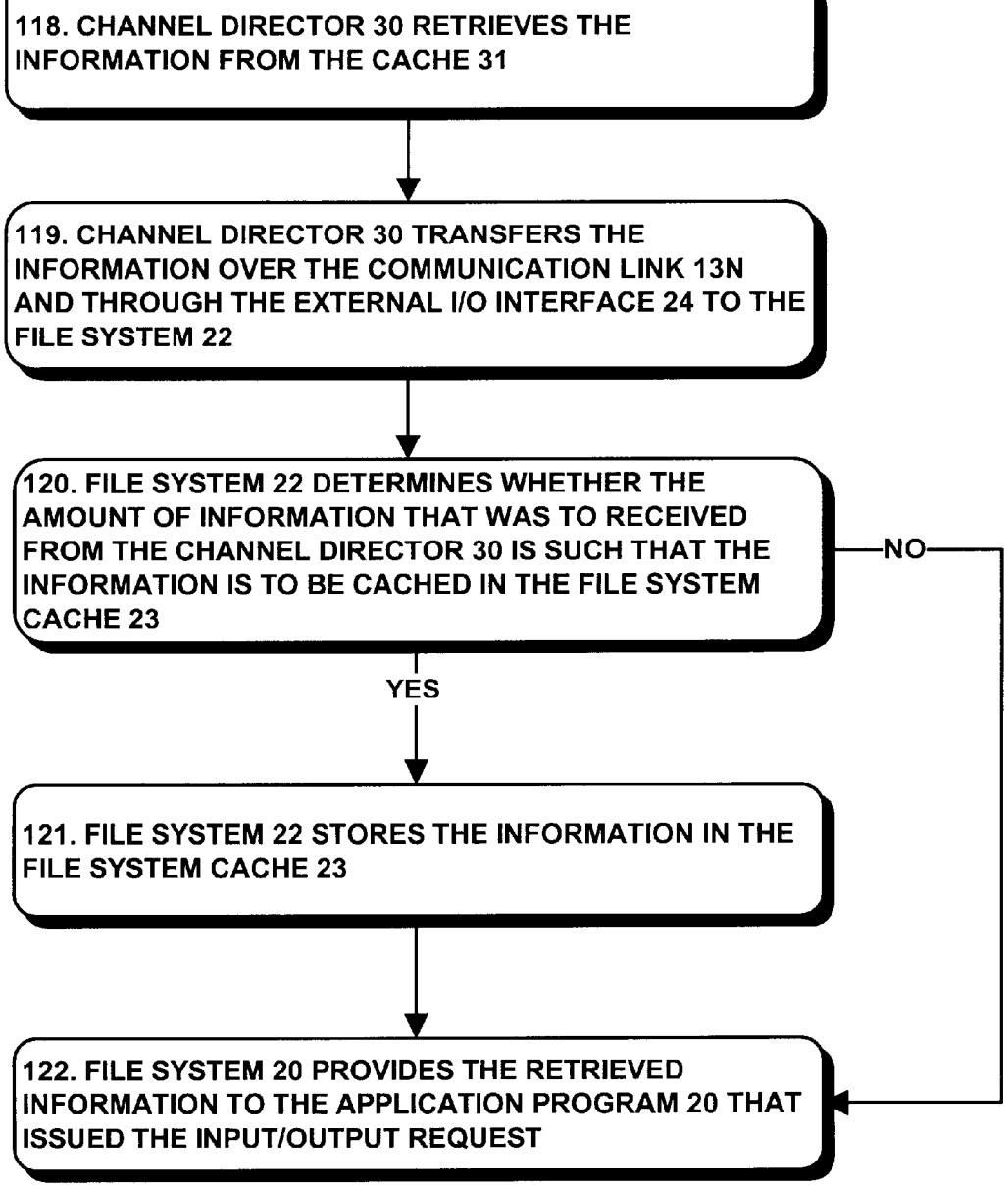

FIG. 3 is a flow chart depicting operations performed by the system 10 in connection with the invention. In FIG. 3, it will be assumed that the system 10 conforms to the first alternative mentioned above, that is, that the file system 22 will determine whether to cache information that is to be stored or retrieved based on the size of the input/output block that is to be stored or retrieved during the write or retrieval operation, although it will be appreciated that it may determine whether the information is to be cached based on the type of the application program that initiated the input/output operation, or any other criterion or set of criteria described herein. Accordingly, and with reference to FIG. 3, after an application program 20 generates an input/output request, which may be either a write request or a read request, and provides it to the file system 22 (step 100), the file system 22 will determine the type of input/output request (step 101). If the file system 22 determines that the input/output request is to initiate a storage operation, it will sequence to step 102 to determine whether the amount of information that is to be written is such that the information is to be cached in the file system cache 23. If the file system 22 makes a positive determination in step 102, it will copy the information to be stored from a buffer pointed to by the input/output request to the file system cache (step 103).

Following step 103, or step 102 if the file system 22 makes a negative determination in that step, the file system 22 will sequence to step 104 to generate a write request for transfer to the mass storage subsystem 12. After the file system 22 generates the write request, it will transfer it through the external input/output interface 24 and over the respective communication link 13n to the channel director 30 (step 105). After the channel director 30 receives the write request, it will cache the information to be stored in the cache 31 (step 106) and provide a notification to the disk director 32 (step 107). At some point thereafter, the disk director 32 can enable the information to be retrieved from the cache 31 and stored on the disk storage device(s) 33 (step 108).

Returning to step 101, if the file system 22 determines that the input/output request is a read request, it will sequence to step 110, in which it will determine whether the information to be retrieved is in its file system cache 23. If the file system 22 makes a positive determination in step 110, it will retrieve the information from the file system cache 23 and provide it to the application program 20 that generated the input/output request (step 111). On the other hand, if the file system 22 makes a negative determination in step 110, which will be the case if the information to be retrieved is not in the file system cache 23, it will sequence to step 112, in which it generates a read request, and transfers the read request through the external input/output interface 24 and over the respective communication link 13n to the channel director 30. After the channel director 30 receives the read request, it will determine whether the information to be retrieved is in the cache 31 (step 113). If the channel director 30 makes a negative determination in step 113, it will provide a notification of the read request to the disk director 32 (step 114). At some point later, the disk director 32 will retrieve the requested information from the disk storage device(s) 33 (step 115), store it in the cache 31 (step 116) and provide a notification to the channel director 30 that the information is stored in the cache 31 (step 117).

After receiving the notification from the disk director 32 in step 116, or following step 112 if the channel director 30 makes a positive determination in that step, the channel director 30 will retrieve the information from the cache 31 (step 118) and transfer the information over the communication link 13n and through the external input/output interface 24 to the file system 22 (step 119). After the file system 22 receives the information from the channel director 30, it will determine whether amount of the information to be read such that the information is to be cached in the file system cache 23 (step 120). If the file system 22 makes a positive determination in step 120, it will store the information in the file system cache 23 (step 121). Following step 121, or step 120 if the file system makes a negative determination in that step, the file system 20 will provide the retrieved information to the application program 20 that issued the input/output request (step 122).

The invention provides a number of advantages. In particular, the invention provides an arrangement for selectively disabling caching by a host computer's file system 20 in a local file system cache generally based on the size of input/output blocks that are to be stored or retrieved during an input/output operation, when the mass storage subsystem connected to the host computer has a cache. In addition to speeding up storage and retrieval operations when input/output block sizes are large, this can also relieve the host computer's processor of the necessity of performing some processing operations, in particular operations related to caching of information in the file system cache 23, freeing up the processor to perform other operations. This can allow the host computer to process programs more rapidly than otherwise, enhancing the host computer's processing performance.

It will be appreciated that a number of changes and modifications may be made to the system 10 described above. For example, instead of each host computer 11n being connected to the mass storage subsystem over a respective communication link 13n, a communication link 13n can comprise a local area network ("LAN") that connects a plurality of host computers to the mass storage subsystem 12 over a single link. In addition, although the mass storage subsystem 12 has been described as having a particular organization, it will be appreciated that the mass storage subsystem may have any of a number of types of organizations.

Furthermore, although the system 10 has been described such that a plurality of host computers 11n are connected to the mass storage subsystem 12 through one channel director, it will be appreciated that the mass storage subsystem 12 may include a plurality of channel directors through which host computers 11n are connected. In addition, ones of the host computers 11n can be connected to a mass storage subsystem 12 through several channel directors to provide, for example, redundancy. Furthermore ones of the host computers 11n can be connected to a plurality of mass storage subsystems through channel directors on each mass storage subsystem.

If, as noted above, a host computer 11n is connected to a mass storage subsystem 12 over a plurality of communication links 13n, the file system also make use of load balancing arrangements to make use of at least two of the communication links connecting the host computer 11n to the mass storage subsystem 12. The combination of selectively enabling or disabling caching by the file system based on one or more criteria and use of load balancing arrangements to balance communications across multiple communication links can provide significant advantages in some environments.

In addition, although the system has been described in connection with a particular mathematical model (equations (1) through (10) above), and specifically the quadratic form of the non-linear response time due to caching by the file system (reference equation (3)), it will be appreciated that the response time due to caching by the file system may have other forms, including other non-linear forms, in which case any mathematical model that may be used in connection with determining values for $S_{BL}^{max}$ may reflect the other forms.

Although, as described above, the file system 22 can determine whether to cache information to be read or written during an input/output operation based on a value related to the amount of information to be transferred, it will be appreciated that the value may not necessarily correspond precisely to, for example, $S_{BL}^{max}$. Since caching by the file system 22 makes use of some of the host computer's processor capacity in performing the caching, and the host computer's memory in providing the file system cache, it may be desirable to, for example, provide that the file system 22 use a block size somewhat smaller than $S_{BL}^{max}$, which can reduce the amount of processor capacity that might be devoted to file system caching. In addition, given that the file system only selectivel caches information, the amount of host computer memory devoted to the file system cache may be reduced with little or no effect on file system operations.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An arrangement for use in connection with a host computer connected to a mass storage subsystem, the mass storage subsystem storing information for use in connection with processing of at least one program by the host computer, the arrangement comprising:

A. a program input/output interface module configured to receive program input/output read and write requests from a program, each program input/output request initiating an input/output operation in connection with information stored on a mass storage subsystem;

B. a mass storage subsystem interface module configured to facilitate communications with the mass storage subsystem, including transferring a storage subsystem input/output request thereto and receiving information therefrom;

C. a file system control module configured to, in response to a program input/output read or write request received by the program input/output interface module, generate a storage subsystem input/output read or write request for transmission by the mass storage subsystem interface module to the mass storage subsystem and to transfer information to be transferred during the input/output operation between the program input/output interface module and the mass storage subsystem interface module, and to selectively cache the information in a file system cache maintained by the host computer in relation to the amount of information to be transferred during the input/output operation, and in which the file system control module is configured to determine whether to cache information in relation to the amount of information to be transferred being determined in relation to a mathematical model that models response time in connection with caching by the file system as a function of the amount of information to be transferred during the input/output operation, and in which the file system control module is configured to determine whether to cache information in relation to the amount of information to be transferred being a function of $$S_{BL}^{max} \sqrt{\frac{R'_{sup} + R_{FSC_0}}{\beta}}$$

where (i) $R'_{SUP}$ corresponds to a portion of response time of the mass storage subsystem that does not depend on the amount of information that is to be stored or retrieved by the mass storage subsystem during the input/output operation, and $R_{FSC_0}$ and $\beta$ are constants that relate the amount of information to be transferred $S_{BL}$ and $R_{FSC}$, which corresponds to a contribution of response time for the input/output operation corresponding to the time to store information in the file system cache during a storage operation $$R_{FSC} = R_{FSC_0} + \alpha' S_{BL} + \beta' S_{BL}^2.$$

2. An arrangement as defined in claim 1 in which the file system control module is configured to not cache information in the file system cache if the amount of information to be transferred during the input/output operation is greater than $S_{BL}^{max}$.

3. A method of operating a file system for use in connection with a host computer connected to a mass storage subsystem, the mass storage subsystem storing information for use in connection with processing of at least one program by the host computer, the method comprising the steps of:

A. receiving program input/output read and write requests from a program, each program input/output read and write request initiating an input/output operation in connection with information stored on a mass storage subsystem;

B. facilitating communications with the mass storage subsystem, including transferring storage subsystem input/output read and write requests thereto and receiving information therefrom; and C. in response to a program input/output read or write request received by the program input/output interface module, (i) generating a storage subsystem input/output read or write request for transmission by the to the mass storage subsystem;

(ii) transferring information to be transferred during the input/output operation between the program and the mass storage subsystem;

(iii) selectively caching the information in a file system cache maintained by the host computer and determining whether to cache information in relation to the amount of information to be transferred during the input/output operation in relation to the amount of information to be transferred, determined in relation to a mathematical model that models response time in connection with caching by the file system as a function of the amount of information to be trans ferred during the input/output operation and being a function of:

$$S_{BL}^{max} \sqrt{\frac{R'_{sup} + R_{FSC_0}}{\beta}}$$

where (i) $R'_{SUP}$ corresponds to a portion of response time of the mass storage subsystem that does not depend on the amount of information that is to be stored or retrieved by the mass storage subsystem during the input/output operation, and $R_{FSC_0}$ and $\beta$ are constants that relate the amount of information to be transferred $S_{BL}$ and $R_{FSC}$, which corresponds to a contribution of response time for the input/output operation corresponding to the time to store information in the file system cache during a storage operation $$R_{FSC} = R_{FSC_0} + \alpha' S_{BL} + \beta S_{BL}^2.$$

4. A method as defined in claim 3 in which the information is not cached in the file system cache if the amount of information to be transferred during the input/output operation is greater than $S_{BL}^{max}$.

5. A computer program product for use in connection with a host computer to provide an arrangement for controlling a file system for the host computer, the host computer being connected to a mass storage subsystem, the mass storage subsystem storing information for use in connection with processing of at least one program by the host computer, the computer program product comprising a computer-readable medium having encoded thereon:

A. a program input/output interface module configured to enable the host computer to receive program input/output read and write requests from a program, each program input/output read and write request initiating an input/output operation in connection with information stored on a mass storage subsystem;

B. a mass storage subsystem interface module configured to enable the host computer to facilitate communications with the mass storage subsystem, including transferring a storage subsystem input/output read and write request thereto and receiving information therefrom; and C. a file system control module configured to enable the host computer to, in response to a program input/output read or write request received by the program input/output interface module, generate a storage subsystem input/output read or write request for transmission by the mass storage subsystem interface module to the mass storage subsystem and to transfer information to be transferred during the input/output operation between the program input/output interface module and the mass storage subsystem interface module, and to selectively cache the information in a file system cache maintained by the host compute, and in which the file system control module is configured to enable the host computer to selectively cache information in relation to the amount of information to be transferred during the input/output operation, and in which the file system control module is configured enable the host computer to determine whether to cache information in relation to the amount of information to be transferred being determined in relation to a mathematical model that models response time in connection with caching by the file system as a function of the amount of information to be transferred during the input/output operation being a function of $$S_{BL}^{max} \sqrt{\frac{R'_{sup} + R_{FSC_0}}{\beta}}$$

where (i) $R'_{SUP}$ corresponds to a portion of response time of the mass storage subsystem that does not depend on the amount of information that is to be stored or retrieved by the mass storage subsystem during the input/output operation, and $R_{FSC_0}$ and $\beta$ are constants that relate the amount of information to be transferred $S_{BL}$ and $R_{FSC}$, which corresponds to a contribution of response time for the input/output operation corresponding to the time to store information in the file system cache during a storage operation $$R_{FSC} = R_{FSC_0} + \alpha' S_{BL} + \beta S_{BL}^2.$$

6. A computer program product as defined in claim 5 in which the file system control module is configured to enable the host computer to not cache information in the file system cache if the amount of information to be transferred during the input/output operation is greater than $S_{BL}^{max}$.

* * * * *